United States Patent

Yoshimaru et al.

Patent Number: 5,560,871
Date of Patent: Oct. 1, 1996

[54] METHOD FOR PREPARING ELECTRICALLY-CONDUCTIVE ZINC OXIDE

[75] Inventors: Katsuhiko Yoshimaru, Saitama; Hideo Komiya, Fukuoka; Takao Hayashi, Yamaguchi; Nobuyoshi Kasahara, Saitama, all of Japan

[73] Assignee: Mitsui Mining & Smelting Co., Ltd., Tokyo, Japan

[21] Appl. No.: 517,860

[22] Filed: Aug. 14, 1995

Related U.S. Application Data

[63] Continuation of Ser. No. 148,364, Nov. 8, 1993, abandoned.

[30] Foreign Application Priority Data

Nov. 9, 1992 [JP] Japan .................. 4-322257

[51] Int. Cl.⁶ ..................... H01B 1/08; H01B 1/16
[52] U.S. Cl. .................. 252/518; 423/623; 430/56; 430/60; 430/62
[58] Field of Search .............. 252/518; 423/623; 430/56, 60, 62

[56] References Cited

U.S. PATENT DOCUMENTS

| | | | |
|---|---|---|---|
| 1,522,097 | 1/1925 | Breyer et al. | |
| 2,331,599 | 10/1943 | Cyr | 423/623 |
| 3,089,856 | 5/1963 | Cyr et al. | 252/518 |
| 3,551,356 | 12/1970 | Bowman | 252/518 |
| 4,623,601 | 11/1986 | Lewis et al. | 430/69 |
| 5,089,248 | 2/1992 | Akhtar | 423/604 |
| 5,102,650 | 4/1992 | Hayashi et al. | 423/622 |
| 5,171,364 | 12/1992 | Sato et al. | 106/425 |

FOREIGN PATENT DOCUMENTS

| | | |
|---|---|---|
| 780787 | 3/1968 | Canada . |
| 0408308 | 1/1991 | European Pat. Off. . |
| 1559324 | 3/1969 | France . |
| 54-161598 | 12/1979 | Japan . |
| 55-10478 | 1/1980 | Japan . |
| 56-120518 | 5/1981 | Japan . |
| 56-69266 | 6/1981 | Japan . |
| 120518 | 7/1981 | Japan . |
| 58-15068 | 1/1983 | Japan . |
| 58-161923 | 9/1983 | Japan . |
| 1-126228 | 5/1989 | Japan . |
| 3-60429 | 3/1991 | Japan . |
| 60429 | 3/1991 | Japan . |
| 660429 | 3/1991 | Japan . |
| 3-115122 | 5/1991 | Japan . |
| 1084062 | 1/1965 | United Kingdom . |
| 1181580 | 2/1970 | United Kingdom . |

OTHER PUBLICATIONS

*Grant & Hackh's Chemical Dictionary*, 5th ed., p. 446, 1987.

*Primary Examiner*—Paul Lieberman
*Assistant Examiner*—Gregory R. Delcotto
*Attorney, Agent, or Firm*—Sughrue, Mion, Zinn, Macpeak & Seas

[57] ABSTRACT

A method for preparing electrically-conductive zinc oxide is herein disclosed, which comprises the steps of preparing a vapor mixture comprising zinc vapor and vapor of at least one member selected from the group consisting of dopant-forming metal compounds having boiling points of not more than that of zinc and free of oxygen atom in a predetermined mixing rate ranging from 0.005 to 5 parts by weight of the dopant-forming metal, as expressed in terms of the oxide thereof, per 100 parts by weight of zinc, as expressed in terms of zinc oxide; then oxidizing the vapor mixture with an oxidizing gas.

10 Claims, 1 Drawing Sheet

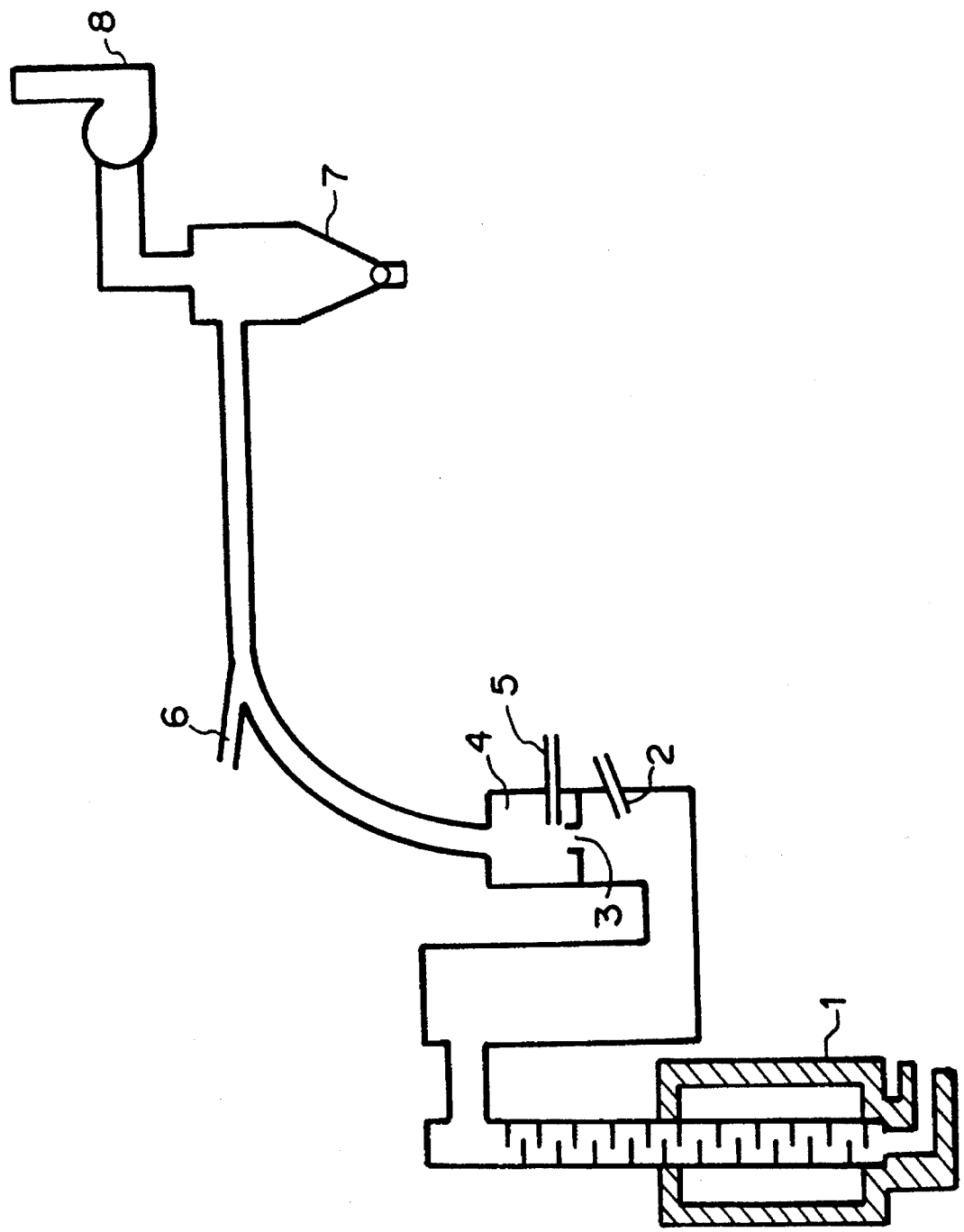

METHOD FOR PREPARING ELECTRICALLY-CONDUCTIVE ZINC OXIDE

This is a Continuation of application Ser. No. 08/148,364 filed Nov. 8, 1993.

BACKGROUND OF THE INVENTION

1. Field of the Invention

The present invention relates to a method for preparing electrically-conductive zinc oxide and more specifically to a method which permits, at low cost, the preparation of non-toxic electrically-conductive zinc oxide which has a high whiteness, which is free of coarse particles and correspondingly has a sharp particle size distribution, which has a powder specific resistance of little dispersion because a dopant is uniformly distributed, and which has a low volume specific resistance.

2. Description of the Prior Art

Zinc oxides are useful as pigments kneadable with paints and varnishes, resins, rubbers and fibers and there has been desired for the development of zinc oxides having excellent electrical conductivity, in particular, in antistatic applications. Incidentally, electrical insulating properties of plastics become causes of various technical problems in several applications thereof. For instance, the electrical insulating properties of plastics become obstacles in, for instance, shielding electric parts from a relatively high electromagnetic field observed when a computer housing is, for instance, used or in discharging of electrically-charged parts. The electrical insulating properties of plastics also become causes of various problems in storing high performance explosives or IC parts, in preparing carpets which are subjected to an antistatic treatment or rubber products for medical use, or in preparing electrically-conductive adhesives for metals.

It has been known that a polymer can be converted into a electrically-conductive material through incorporation of electrically-conductive particles. As fine substances capable of imparting electrical conductivity to, for instance, plastics, paints and varnishes through incorporation thereof into these substances, there have been known, for instance, metal particles or carbon black particles; particles of semiconductor oxides such as zinc oxide and iodides (e.g., copper iodide); tin oxide powder doped with, for instance, antimony; zinc oxide powder doped with, for instance, aluminum; or powder of, for instance, titanium oxide and aluminum oxide coated with tin oxide; and fibrous materials such as glass fibers, alkali metal titanate fibers and titanium oxide fibers coated with tin oxide.

If metal particles or carbon black particles are used as electrically-conductive particles, polymers are blackened by the addition of such additives. This is often undesirable in most applications thereof. A polymer comprising copper iodide has a very low chemical stability and this substantially limits the application of the polymer. Moreover, antimony-doped tin oxide powder is excellent in a electrical conductivity-imparting ability, but the resulting polymer has a blue-black color tone due to the doped antimony and suffers from a problem of low whiteness. Further a problem of toxicity arises when antimony is used as a dopant. Thus, the polymers comprising antimony-doped tin oxide powder are substantially limited in the applications thereof.

Conventional methods for preparing electrically-conductive zinc oxide comprise the steps of adding specific metal compounds such as aluminum oxide to powdery zinc oxide and calcining the resulting mixture in the presence of solid carbon (see, for instance, Japanese Un-examined Patent Publication (hereinafter referred to as "J. P. KOKAI") Nos. Sho 54-161598, Sho 55-10478 and Sho 58-15068). In these methods, zinc oxide is doped with aluminum by calcining, at a high temperature, zinc oxide powder as a starting material in the presence of aluminum in a reducing atmosphere. However, the resulting zinc oxide has a tinge of grayish color due to the calcination in the reducing atmosphere and is, accordingly, insufficient in whiteness. Moreover, the calcination at a high temperature results in sintering and growth of zinc oxide particles formed and hence leads to the formation of coarse particles. In addition, these methods comprise complicated processes since powdery zinc oxide is used as a starting material and these methods require the use of a reductive calcination process and the production cost thereof is higher than that of carbon black.

Furthermore, various publications such as J. P. KOKAI Nos. Sho 56-69266, Sho 58-161923, Hei 1-126228 and Hei 3-115122 disclose methods comprising the steps of neutralizing a solution containing a zinc salt and a salt of a specific metal such as aluminum to co-precipitate these components and then subjecting the precipitates thus formed to a reductive calcination. However, these methods also suffer from the aforementioned problems of low whiteness, need for complicated processes and high production cost.

SUMMARY OF THE INVENTION

Accordingly, it is an object of the present invention to provide a method which permits, at low cost, the production of non-toxic electrically-conductive zinc oxide which has a high whiteness, which is free of coarse particles and correspondingly has a sharp particle size distribution, which has a powder specific resistance of little dispersion because a dopant is uniformly distributed, and which has a low volume specific resistance.

The inventors of this invention have conducted various studies to achieve the foregoing object, have found out that the foregoing object can effectively be accomplished by oxidizing a vapor mixture which comprises zinc vapor and vapor of a dopant-forming metal compound in a specific mixing ratio and thus have completed the present invention.

According to the present invention, there is provided a method for preparing electrically-conductive zinc oxide which comprises the steps of preparing a vapor mixture comprising zinc vapor and vapor of at least one member selected from the group consisting of dopant-forming metal compounds having boiling points of not more than that of zinc and free of oxygen atom in a predetermined mixing rate ranging from 0.005 to 5 parts by weight of the dopant-forming metal, as expressed in terms of the oxide thereof, per 100 parts by weight of zinc, as expressed in terms of zinc oxide; then oxidizing the vapor mixture with an oxidizing gas.

BRIEF DESCRIPTION OF THE DRAWING

FIG. 1 is a schematic diagram for illustrating an embodiment of the apparatus used for practicing the method for preparing electrically-conductive zinc oxide according to the present invention.

DESCRIPTION OF THE PREFERRED EMBODIMENTS

The dopant-forming metal compounds used in the present invention are those having boiling points of not more than that of zinc and free of oxygen atom. This is because if a dopant-forming metal compound having a boiling point higher than that of zinc is employed, the vapor thereof causes condensation upon mixing it with zinc vapor having a temperature lower than the boiling point of the compound. Accordingly, it is difficult to convert the dopant-forming metal compound into a desired dopant and further an excess energy is required for vaporization of a compound having such a high boiling point. On the other hand, the use of an oxygen-containing dopant-forming metal compound leads to formation of an oxide of the metal when the vapor of the compound is exposed to a high temperature and the metal oxide thus formed does not serve as a dopant at all.

The dopant-forming metal compounds used in the present invention are, for instance, compounds of trivalent, tetravalent or pentavalent metals commonly used as dopants such as Al, Ga, In, Sn, Ge and Si (e.g., halides (preferably chlorides or bromides) and organometal compounds of these metals) and specific examples thereof include $AlCl_3$, $GaCl_3$, $InCl_3$, $SnCl_4$, $GeCl_4$, $SiCl_4$, $AlBr_3$ and $SnBr_4$.

In the method of the present invention, the vapor mixture comprising zinc vapor and vapor of the dopant-forming metal compound can easily be prepared by injecting, through a nozzle, the dopant-forming metal compound in the form of vapor or in the form of fine powder suspended in an inert gas as a carrier into a stream of the zinc vapor prior to the introduction thereof into an oxidation chamber. In this respect, the dopant-forming metal compound which is injected into the zinc vapor in the form of fine powder is vaporized during passing through the nozzle due to the sensible heat of the zinc vapor maintained at a temperature of, for instance, 910° C. or after it is injected into the zinc vapor through the nozzle and before it enters into the oxidation chamber to thus form a vapor mixture with the zinc vapor. At this injection process, the amount of the vapor of the dopant-forming metal compound is controlled to a range of from 0.005 to 5 parts by weight (as expressed in terms of the oxide of the dopant-forming metal compound) per 100 parts by weight of zinc (as expressed in terms of zinc oxide). If the amount of the dopant-forming metal compound is less than the lower limit defined above, the resulting electrically-conductive zinc oxide often has an insufficient electrical conductivity, while if it exceeds the upper limit, the effect due to the addition of the dopant is not increased any more in proportion to the added amount thereof and the whiteness of the resulting product is inversely apt to decrease.

In the method according to the present invention, the foregoing vapor mixture is introduced into an oxidation chamber and the vapor mixture is mixed, in the chamber, with an oxidizing gas injected therein through a nozzle to thus burn and oxidize the zinc vapor. In the present invention, the vapor mixture may be burnt and oxidized in an open oxidation chamber or an oxidizing gas-injection nozzle may be positioned in the proximity of the outlet of the vapor mixture-injection nozzle in the oxidation chamber so that an oxidizing gas is forced to blow in the oxidation chamber containing the vapor mixture to thus burn and oxidize the vapor. Examples of oxidizing gases usable in the present invention include air, air rich in oxygen (for instance, those having an oxygen content ranging from 25 to 50% by volume) and pure oxygen gas, but in general air and air rich in oxygen are used. These oxidizing gases at room temperature may be used as such or they may likewise be used after heating to a predetermined temperature level. The amount of the oxidizing gas used in the invention is not restricted to any specific range so far as it is higher than the lowest level required for the complete oxidation of the zinc in the vapor mixture. In this respect, the particle size and the particle size distribution of the resulting zinc oxide are somewhat affected by the amount of oxygen used and, therefore, the amount of the oxidizing gas to be used may appropriately selected depending on the desired particle size and particle size distribution of the resulting zinc oxide.

Incidentally, when a halide is used in the present invention as the dopant-forming metal compound, a trace amount of halogen molecules is sometimes adsorbed on the resulting zinc oxide depending on the conditions for the oxidation. For this reason, if the resulting electrically-conductive zinc oxide is used in applications which may adversely be affected by the presence of a trace amount of halogen molecules (in particular chlorine molecules), hydrogen gas may be added to the oxidizing gas injected into the vapor mixture comprising zinc vapor and vapor of the dopant-forming metal compound in an amount less than the lower explosive limit of the resulting oxidizing gas/hydrogen gas mixture, or the resulting electrically-conductive zinc oxide may be washed with water and then dried to give electrically-conductive zinc oxide free of halogen molecules.

The method according to the present invention will hereinafter be explained in more detail with reference to the accompanying drawing.

FIG. 1 is a diagram schematically illustrating an embodiment of the apparatus used for practicing the method of the present invention. In FIG. 1, reference numeral 1 represents a rectifying column for refining zinc, 2 a nozzle for injecting vapor or fine powder of a dopant-forming metal compound, 3 a nozzle for injecting a vapor mixture, 4 an oxidation chamber, 5 a nozzle for injecting an oxidizing gas, 6 a tube for introducing cooling air, 7 a bag filter and 8 an aspiration fan respectively. The nozzle 2 for injecting vapor or fine powder of a dopant-forming metal compound is represented by a simplified form in FIG. 1, but the structure thereof is not restricted to a specific one so far as the nozzle permits the supply of vapor or fine powder of a dopant-forming metal compound to the oxidation chamber at a constant velocity. The nozzle 5 for injecting an oxidizing gas is likewise depicted in a simplified form in FIG. 1, but the structure thereof is not likewise restricted to any particular one so far as the structure thereof allows direct blowing of an oxidizing gas in the oxidation chamber containing the vapor mixture. It is preferred to design the nozzle 5 such that the zinc vapor is instantaneously oxidized with the oxidizing gas injected through the nozzle 5 immediately after the zinc vapor is injected through the vapor mixture-injection nozzle 3.

In the apparatus shown in FIG. 1, the rectifying column 1 for refining zinc is used as a source for generating zinc vapor, but other zinc vapor-generating devices such as a retort, a crucible or an electric furnace may likewise be used in the method according to the present invention. The rectifying column 1 for refining zinc permits continuous discharge of highly pure zinc vapor in a large amount and the amount of the zinc vapor discharged is liable to be stabilized within a deviation of ±10%. Therefore, the oxidation chamber is preferably directly connected to the rectifying column 1 used in a dry zinc-refining process as shown in FIG. 1. Moreover, the use of the rectifying column 1 for refining zinc is also preferred, since it is not necessary, in this case, to discharge the zinc vapor in the form of a mixture with an inert gas as a carrier gas.

The zinc vapor refined and evaporated in the rectifying column 1 is uniformly mixed with vapor of a dopant-forming metal compound injected in the oxidation apparatus through the nozzle 2 to form a vapor mixture and the resulting vapor mixture is injected into the oxidation chamber 4 through the vapor mixture-injecting nozzle 3. The vapor mixture-injecting nozzle 3 preferably has an orifice whose cross sectional area is not less than 2 cm² in order to prevent any clogging thereof. In the method according to the present invention, it is also preferred to control the zinc vapor-generating rate to a level of not less than 6 g/min in order to improve the productivity rate and to prevent any clogging of the nozzle. Furthermore, the temperature of the zinc vapor is preferably not less than 850° C. This is because if the temperature of the zinc vapor is less than 850° C., it is often observed that a part of the zinc remains unreacted. If the zinc vapor used in the invention is discharged in the form of a mixture with a carrier gas such as an inert gas, the vapor mixture-injecting nozzle 3 possibly causes clogging in the proximity of the outlet thereof. Therefore, it is preferred, in the present invention, to use zinc vapor without using any carrier gas.

In the method of the present invention, the vapor mixture may be burnt and oxidized by simply injecting the mixture through the vapor mixture-injecting nozzle 3 in an open oxidation chamber, but an oxidizing gas-injection nozzle 5 may be positioned in the proximity of the outlet of the vapor mixture-injection nozzle 3 in the oxidation chamber so that an oxidizing gas is forced to blow in the oxidation chamber containing the vapor mixture to thus burn and oxidize the vapor.

In the present invention, the oxidizing gas is in general used in such an amount that it can supply an amount of oxygen which is slightly greater than 1 and not more than about 50 expressed in terms of equivalent ratio of oxygen to zinc present in the zinc vapor discharged from the vapor mixture-injecting nozzle 3 (equivalent ratio: $O_2/Zn$). If the content of oxygen in the oxidizing gas is less than the lower limit defined above, the oxidation of the vapor mixture is insufficient, while if it exceeds the upper limit, the vapor mixture is possibly cooled and the oxidation thereof is sometimes insufficient.

The zinc oxide thus prepared is aspirated through the aspiration fan 8, cooled with air introduced into a piping which communicates the oxidation chamber to the aspiration fan through the tube 6 for introducing cooling air and collected through the bag filter 7.

As has been discussed above in detail, the present invention permits the preparation of zinc oxide without causing any clogging of the vapor mixture-injecting nozzle 3 and accordingly the method of the present invention allows the continuous production of ultrafine powder of highly pure zinc oxide.

Moreover, the electrically-conductive zinc oxide prepared according to the present invention can be calcined at a temperature ranging from 200 to 600 in an inert or reducing atmosphere to thus control the volume resistivity of the powdery zinc oxide to a level of less than that of the conventional products and to stabilize the volume resistivity. Furthermore, a reduction in the whiteness can be prevented by appropriately selecting the reducing atmosphere as a calcination condition.

In the method of the present invention, a vapor mixture of zinc vapor and vapor of a dopant-forming metal compound is burnt and oxidized with an oxidazing gas. Therefore, dopant components are uniformly distributed throughout each zinc oxide particle and each dopant element is substituted with a Zn element in the crystal latice of zinc oxide. For this reason, the resulting electrically-conductive zinc oxide has a uniform powder specific resistance of little dispersion. Thus, the method according to the present invention can eliminate the need for a conventionally used reductive calcination process required for stable substitution of Zn elements in the zinc oxide crystal latice with dopant elements. This permits the elimination of oxygen defects possibly formed in the zinc oxide crystal latice due to the reductive calcination and ensures a high whiteness of the resulting electrically-conductive zinc oxide. Moreover, the method of the present invention makes it possible to continuously prepare electrically-conductive zinc oxide at a high reaction rate and at low cost through a simple technical means.

Furthermore, if the electrically-conductive zinc oxide prepared according to the present invention is calcined in an inert or reducing atmosphere, the resulting powdery product has a low and stable volume resistivity as compared with those prepared by the conventional methods. In addition, the use of a reducing atmosphere as a calcination condition milder than that used in the conventional methods permits the maintenance of a desired high whiteness of the resulting product.

The method of the present invention will hereinafter be explained in mode detail with reference to the following working Examples, but the present invention is by no means limited to these specific Examples.

EXAMPLE 1

Conductive zinc oxide was prepared according to the following manner using an apparatus having the structure shown in FIG. 1. Anhydrous aluminum chloride ($AlCl_3$) as a dopant-forming metal compound was blown in the apparatus through a nozzle 2 at a predetermined velocity of 1.92 kg/h using an $N_2$ gas-purged oscillating feeder and $N_2$ gas as a carrier. On the other hand, zinc vapor maintained at 910° C. which had been evaporated and refined in a rectifying column 1 for purifying zinc at an evaporation speed of 30 kg/h was introduced into a mixing zone of the apparatus to give a vapor mixture comprising the zinc vapor and the $AlCl_3$ vapor or dispersion. The resulting vapor mixture was introduced into an oxidation chamber 4 through a vapor mixture-injecting nozzle 3. The oxization chamber was in an open system so that the surrounding air freely flowed into the oxidation chamber and accordingly the vapor mixture was burnt and oxidized without forcing the air to flow into the chamber. The zinc oxide formed was aspirated by an aspiration fan 8 through a piping, cooled with air introduced into the piping through a cooling air-introducing tube 6 and thus collected by a bag filter 7. Various properties of the zinc oxide thus obtained were determined according to the following methods. The results thus obtained are summarized in the following Table 1.

Volume Resistivity

The resulting zinc oxide was pressure-molded, at a pressure of 2 ton/cm², into a test piece and the volume resistivity of the test piece was determined using a low resistance-determining device (Loresta AP, available from Mitsubishi Petrochemical Co., Ltd.).

Specific Surface Area

This was determined by nitrogen gas adsorption according to the B.E.T. one-point method.

Whiteness

The L value of the electrically-conductive zinc oxide was determined by Color Computer (SM-5 Type, available from Suga Testing Machine Co., Ltd.) and the resulting L value was defined to be the whiteness of the subject zinc oxide.

Moreover, the electrically-conductive zinc oxide prepared in Example 1 was chemically analyzed and the aluminum content thereof was found to be 2.0 parts by weight (as expressed in terms of the weight of aluminum oxide) per 100 parts by weight of zinc oxide. Furthermore, the electrically-conductive zinc oxide was also subjected to an X-ray diffraction analysis and it was found that the peak positions and peak strengths thereof were approximately in agreement with those observed for the reagent zinc oxide. This clearly indicates that the crystallizability of the resulting electrically-conductive zinc oxide is identical to that of the reagent zinc oxide and that it is a composite oxide comprising zinc oxide crystals in which aluminium is doped.

EXAMPLES 2 to 5

Conductive zinc oxides were prepared in the same manner used in Example 1 except that gallium chloride (Example 2), indium chloride (Example 3), stannic chloride (Example 4) and previously admixed gallium chloride and stannic chloride (Example 5) were used instead of the aluminum chloride used in Example 1. Various properties of each resulting electrically-conductive zinc oxide were determined in the same manner used in Example 1. The results thus obtained are summarized in Table 1 given below.

EXAMPLE 6

A vapor mixture was prepared in the same manner used in Example 1 and an oxidizing gas maintained at 40° C. was directly injected into an oxidation chamber 4, in which the mixed vapor was also injected, through an oxidizing gas-injecting nozzle 5 positioned in the chamber 4 in the proximity of the outlet of a vapor mixture-injecting nozzle 3 in an oxygen concentration of 21% by volume (reduced to the standard condition) to oxidize the zinc vapor and to thus give zinc oxide. At this stage, the equivalent ratio of the oxygen present in the oxidizing gas to the zinc present in the mixed zinc vapor (equivalent ratio: $O_2/Zn$) was controlled to 5 as seen from the following Table 2. Various properties of the resulting electrically-conductive zinc oxide were determined in the same manner used in Example 1 and the electrically-conductive zinc oxide thus prepared was chemically analyzed to determine the amount of the un-oxidized zinc. The results thus obtained are listed in Table 2.

EXAMPLES 7 to 11

The same procedures used in Example 1 were repeated except that an oxidizing gas was used under the conditions detailed in Table 2 to give electrically-conductive zinc oxides. Various properties of each resulting electrically-conductive zinc oxide were determined in the same manner used in Example 1. The results thus obtained are summarized in Table 2 given below.

TABLE 1

| Ex. No. | Amount of Dopant | | | | Zn Vapor | | Quality and Properties | | |
|---|---|---|---|---|---|---|---|---|---|
| | $Al_2O_3$ | $Ga_2O_3$ | $In_2O_3$ | $SnO_2$ | Temp. (°C.) | Amount of Evaporation (Kg/h) | Volume Resistivity (Ω · cm) | BET ($m^2/g$) | Whiteness (L*) |
| 1 | 2.0 | — | — | — | 910 | 30 | $1.0 \times 10^1$ | 5.00 | 96.81 |
| 2 | — | 1.0 | — | — | 910 | 30 | $5.0 \times 10^0$ | 4.88 | 97.07 |
| 3 | — | — | 1.0 | — | 910 | 30 | $2.8 \times 10^1$ | 4.73 | 96.07 |
| 4 | — | — | — | 1.0 | 910 | 30 | $2.1 \times 10^1$ | 4.92 | 95.83 |
| 5 | — | 0.1 | — | 0.5 | 910 | 30 | $1.5 \times 10^1$ | 4.85 | 95.79 |

TABLE 2

| Ex. No. | Oxidizing Gas | | | Quality ad Properties | | | |
|---|---|---|---|---|---|---|---|
| | Equivalent Ratio ($O_2/Zn$) | Oxygen Concentration (vol %) | Temperature (°C.) | Volume Resistivity (Ω · cm) | BET ($m^2/g$) | Whiteness (L*) | Content of Unoxidized Zn (ppm) |
| 6 | 5 | 21 | 40 | $1.5 \times 10^1$ | 9.81 | 96.94 | 2 |
| 7 | 5 | 30 | 500 | $1.5 \times 10^1$ | 17.92 | 96.12 | 2 |
| 8 | 20 | 30 | 500 | $2.1 \times 10^2$ | 24.85 | 95.48 | 1 |
| 9 | 50 | 30 | 500 | $2.3 \times 10^1$ | 27.77 | 94.15 | 1 |
| 10 | 20 | 21 | 500 | $9.0 \times 10^1$ | 21.46 | 94.38 | 2 |
| 11 | 20 | 50 | 500 | $1.1 \times 10^2$ | 28.31 | 95.73 | 1 |

EXAMPLES 12 to 14

The electrically-conductive zinc oxide prepared in Example 1 was calcined under the calcination conditions listed in the following Table 3 to give electrically-conductive zinc oxides having properties listed in Table 3.

TABLE 3

| Ex. No. | Conditions for Calcination | | | Volume Resistivity (Ω · cm) | Whiteness (L*) |
|---|---|---|---|---|---|
| | Temp. (°C.) | Time (min) | Atmosphere | | |
| 12 | 300 | 60 | CO | $4.5 \times 10^{-1}$ | 94.53 |
| 13 | 400 | 60 | CO | $2.6 \times 10^{-1}$ | 94.25 |
| 14 | 400 | 60 | $H_2$ | $1.8 \times 10^{-1}$ | 91.11 |

EXAMPLES 15 to 17

The electrically-conductive zinc oxide prepared in Example 8 was calcined under the calcination conditions listed in the following Table 4 to give electrically-conductive zinc oxides having properties listed in Table 4.

TABLE 4

| Ex. No. | Conditions for Calcination | | | Volume Resistivity ($\Omega \cdot cm$) | Whiteness ($L^*$) |
|---|---|---|---|---|---|
| | Temp. (°C.) | Time (min) | Atmosphere | | |
| 15 | 300 | 60 | CO | $7.3 \times 10^0$ | 93.41 |
| 16 | 400 | 60 | CO | $7.1 \times 10^0$ | 93.86 |
| 17 | 400 | 60 | $H_2$ | $9.8 \times 10^{-1}$ | 92.56 |

What is claimed is:

1. A method for preparing electrically-conductive zinc oxide consisting of the steps of preparing a vapor mixture comprising elemental zinc vapor and vapor of at least one dopant-forming metal compound selected from the group consisting of compounds of trivalent and tetravalent or pentavalent metals having boiling points of not more than that of zinc and free of oxygen atom in a predetermined mixing rate ranging from 0.005 to 5 parts by weight of the dopant-forming metal, as expressed in terms of the oxide thereof, per 100 parts by weight of zinc, as expressed in terms of zinc oxide; introducing the resulting vapor mixture into an oxidation chamber through a vapor mixture-injecting nozzle; and then oxidizing the vapor mixture with an oxidizing gas.

2. The method according to claim 1 wherein the dopant-forming metal compound is a chloride or a bromide of Al, Ga, In, Sn, Ge or Si.

3. The method according to claim 2 wherein the dopant-forming metal compound is selected from the group consisting of $AlCl_3$, $GaCl_3$, $InCl_3$, $SnCl_4$, $GeCl_4$, $SiCl_4$, $AlBr_3$ and $SnBr_4$.

4. A method for preparing electrically-conductive zinc oxide consisting of the steps of preparing a vapor mixture comprising elemental zinc vapor and vapor of at least one dopant-forming metal compound selected from the group consisting of compounds of metals having boiling points of not more than that of zinc and free of oxygen atom in a predetermined mixing rate ranging from 0.005 to 5 parts by weight of the dopant-forming metal, as expressed in terms of the oxide thereof, per 100 parts by weight of zinc, as expressed in terms of zinc oxide; introducing the resulting vapor mixture into an oxidation chamber through a vapor mixture-injecting nozzle; oxidizing the vapor mixture with an oxidizing gas; and adding hydrogen gas to the oxidizing gas injected into the vapor mixture in an amount less than the lower explosive limit of the resulting oxidizing gas/hydrogen gas mixture, or washing the resulting electrically-conductive zinc oxide with water and then drying to give electrically-conductive zinc oxide free of halide molecules.

5. A method for preparing electrically-conductive zinc oxide consisting of the steps of preparing a vapor mixture comprising elemental zinc vapor and vapor of at least one dopant-forming metal compound selected from the group consisting of compounds of metals having boiling points of not more than that of zinc and free of oxygen atom in a predetermined mixing rate ranging from 0.005 to 5 parts by weight of the dopant-forming metal, as expressed in terms of the oxide thereof, per 100 parts by weight of zinc, as expressed in terms of zinc oxide; introducing the resulting vapor mixture into an oxidation chamber through a vapor mixture-injecting nozzle; oxidizing the vapor mixture with an oxidizing gas; and calcining the resulting electrically-conductive zinc oxide at a temperature ranging from 200° to 600° C. in an inert or reducing atmosphere.

6. The method according to claim 1 wherein the oxidizing gas is air or air rich in oxygen having an oxygen concentration ranging from 25 to 50% by volume.

7. The method according to claim 1 wherein the vapor mixture is prepared by injecting, through a nozzle, the dopant-forming metal compound in the form of vapor or in the form of fine powder suspended in an inert gas as a carrier into a stream of the elemental zinc vapor prior to the introduction thereof into an oxidation step.

8. The method according to claim 1 wherein elemental zinc vapor is generated by using a rectifying column for purifying zinc.

9. The method according to claim 1 wherein the vapor mixture-injecting nozzle has an orifice whose cross sectional area is not less than 2 $cm^2$ and the zinc vapor generating rate is controlled to not less than 6 g/min.

10. The method according to claim 1 wherein the temperature of the zinc vapor is not less than 850° C.

* * * * *